United States Patent [19]
Schornhorst et al.

[11] Patent Number: 5,713,453
[45] Date of Patent: Feb. 3, 1998

[54] AUTOMATIC FIN ROTATION APPARATUS FOR A HEAT EXCHANGER

[75] Inventors: Carl Eckardt Schornhorst, Canton; Henry Mehraban, Northville, both of Mich.; Gerald Joseph Selm, Connersville, Ind.; Robert Raymond Luttermoser, Westland; Jerry Lee Sexton, Flat Rock, both of Mich.

[73] Assignees: Ford Global Technologies, Inc.; Livernois Research & Development Co., both of Dearborn, Mich.

[21] Appl. No.: 585,672

[22] Filed: Jan. 16, 1996

[51] Int. Cl.⁶ ............................................ B65G 47/244
[52] U.S. Cl. .................. 198/380; 198/401; 414/755; 414/788.3
[58] Field of Search ...................... 198/374, 380, 198/401; 414/788.3, 791.3, 755

[56] References Cited

U.S. PATENT DOCUMENTS

| | | |
|---|---|---|
| 2,668,483 | 2/1954 | Sykes ............................... 198/374 X |
| 3,650,233 | 3/1972 | Young et al. . | 
| 3,853,215 | 12/1974 | Paiva . |
| 4,242,025 | 12/1980 | Thibault . |
| 4,566,359 | 1/1986 | Miyagi et al. . |
| 5,078,260 | 1/1992 | Bensberg et al. .............. 414/788.3 X |
| 5,186,599 | 2/1993 | Fluck .................................. 414/792.9 |

FOREIGN PATENT DOCUMENTS

| | | | |
|---|---|---|---|
| 56-7835 | 1/1981 | Japan | .................. 414/788.3 |
| 61-166432 | 7/1986 | Japan . | |
| 757417 | 6/1978 | U.S.S.R. . | |

Primary Examiner—Karen B. Merritt
Assistant Examiner—Janice L. Krizek
Attorney, Agent, or Firm—Raymond L. Coppiellie, Esq.; Roger L. May, Esq.

[57] ABSTRACT

An apparatus for selectively orienting consecutive fin strips relative to one another as a preliminary step in the manufacture of a heat exchanger includes a sensor for sensing the presence of each of a series of fin strips all having a common orientation relative to one another. The apparatus includes an orienting member which receives signals from the sensor as to the presence of each fin strip and rotates each consecutive fin strips in alternating clockwise and counter-clockwise directions to orient consecutive fin strips 180° relative to each adjacent fin strip.

19 Claims, 3 Drawing Sheets

AUTOMATIC FIN ROTATION APPARATUS FOR A HEAT EXCHANGER

BACKGROUND OF THE INVENTION

1. Field of the Invention

The present invention relates generally to an automatic fin rotation apparatus for use in heat exchangers. More particularly, the present invention relates to an apparatus for selectively orientating consecutive fin strips relative to one another as a preliminary step in the manufacture of a heat exchanger.

2. Description of the Related Art

Heat exchangers are well known in the art. FIG. 1 shows a heat exchanger, generally designated at 10. In these types of heat exchangers, a plurality of elongated plates 12 are joined together such as through brazing or a lamination process to define a plurality of passageways for the movement of a fluid therethrough. Each of the passageways is formed by the inwardly facing surface of a pair of joined plates 12 so as to form a flat tube. The passageways are interconnected so that a fluid may flow through the joined plates forming the heat exchanger. The joined plates also define central fluid conducting sections or "tanks" as they are commonly known in the art. These tanks are generally indicated at 14 in FIG. 1. Conductive fin strips 16 are located between outwardly facing surfaces of the joined plates 12. Heat exchangers of this type have particular utility as evaporators for air conditioning systems of automotive vehicles.

Typically, heat exchangers are manufactured by stacking a plurality of individual plates 12 together to form a flat tube and interleaving fin strips 16 between each tube. End sheets 18 are then placed on opposite ends of the heat exchanger 10 to form a heat exchanger core. An inlet manifold 20 and outlet manifold 22 are then inserted into an aperture formed in the end sheet 18 or tank 14 to provide for fluid communication into and out of the heat exchanger core. The heat exchanger core is brazed in a furnace to complete the manufacturing process.

The fin strips 16 employed in automotive evaporators are manufactured from flat, thin pieces of aluminum. The flat, thin pieces of aluminum are cut to a specific width in an upstream manufacturing process. Due to other manufacturing concerns, however, these sheets of aluminum are cut with a very slight angle on one edge such that the edges of the strip of aluminum are not parallel. The sheet of aluminum then passes through a fin-mill machine which punches louvers or lances into the sheet of aluminum and bends the thin aluminum sheet into a corrugated or serpentine shape. These fins are then juxtaposed between the flat plate like tubes and the evaporator is manufactured as above-described.

When the sides of the sheet of aluminum are not parallel and the sheet is then bent into a corrugated or serpentine shape as is common in the related art, one side of the fin produced thereby will be slightly greater in thickness than the other side. More specifically, the thickness of the fin strip manufactured in such a way includes one edge having a thickness which is approximately 1/1000 of an inch, more or less, greater than the thickness of the other side. Thus, when the heat exchanger is assembled, the fin strips must be stacked alternatingly 180° relative to the adjacent fin strip. This extra step is necessitated to avoid the situation where fin strips are stacked with corresponding edges having the increased thickness disposed one on top of the other such that the heat exchanger manufactured thereby has one side which is longer than the other and causes it to lean.

In practice and to avoid this situation, the fin strips manufactured in the fin mill must be manually orientated prior to the assembly of the heat exchanger such that adjacent fin strips are disposed 180° relative to each other. This is a labor intensive, monotonous and expensive step in the manufacturing process resulting in greater cost to the end product.

Accordingly, there is a need in the art to provide for an apparatus which automatically rotates adjacent fin strips relative to one another prior to their assembly in the heat exchanger and without manual input.

SUMMARY OF THE INVENTION

The present invention is an apparatus for selectively and automatically orienting consecutive fin strips relative to one another as a preliminary step in the manufacture of a heat exchanger. The apparatus includes a sensor for sensing the presence of a series of fin strips supplied to the apparatus from an upstream manufacturing process wherein each fin strip in the series has a common orientation relative to one another. The apparatus further includes an orienting member which receives signals from the sensor as to the presence of each fin strip and rotates each consecutive fin strip in alternating clockwise and counter-clockwise directions to orientate consecutive fin strips 180° relative to each adjacent fin strip. The fin strips are then ready for assembly in a heat exchanger without the necessity of manually orientating the fin strips.

A method for automatically rotating such fin strips in preparation for the assembly of a heat exchanger is also disclosed.

One advantage of the present invention is that it provides an apparatus for selectively and automatically orienting consecutive fin strips relative to one another as a preliminary step in the manufacture of a heat exchanger. Another advantage of the present invention is that the apparatus automatically rotates adjacent fin strips such that they are orientated 180° relative to one another. Still another advantage of the present invention is that it eliminates a labor intensive, monotonous and costly step in the process of manufacturing heat exchangers.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 2:
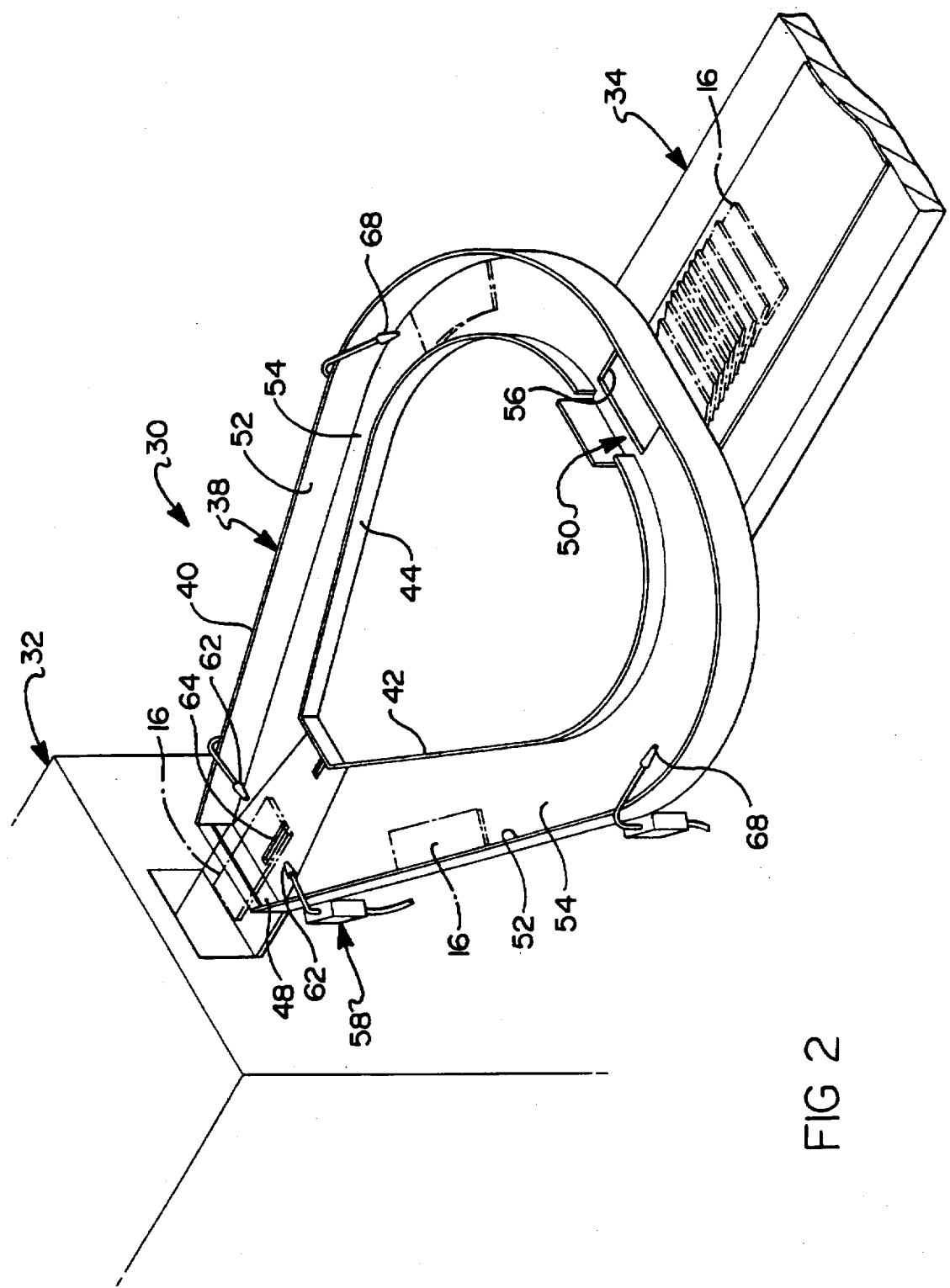
FIG. 2 is a perspective view of an automatic fin rotation apparatus according to the present invention.

One embodiment of an automatic fin rotation apparatus is generally indicated at 30 in FIGS. 2 through The apparatus 30 is employed for selectively and automatically orienting consecutive fin strips 16 relative to one another as a preliminary step in the manufacturing of heat exchangers. The apparatus 30 is disposed adjacent a fin mill machine generally indicated as a black box at 32. The fin mill machine 32 is employed for making a series of fin strips 16 for use in heat exchangers. The apparatus 30 is also located adjacent a preassembly staging area, generally indicated at 34. The preassembly staging area 34 may include a conveyor or table on which the properly orientated fin strips 16 are automatically placed. It should be appreciated that the fin mill machine 32 is conventional and known in the art.

Figure 1:
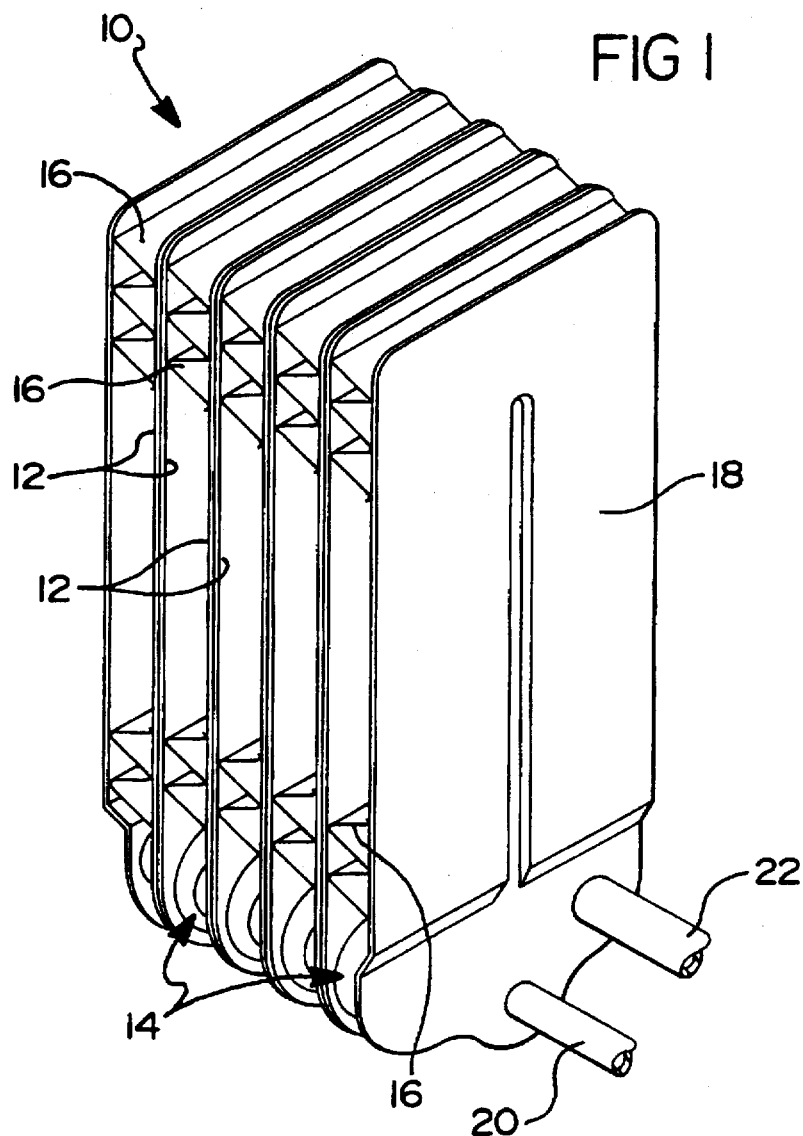
FIG. 1 is a partial perspective view of a heat exchanger.
Figure 5:
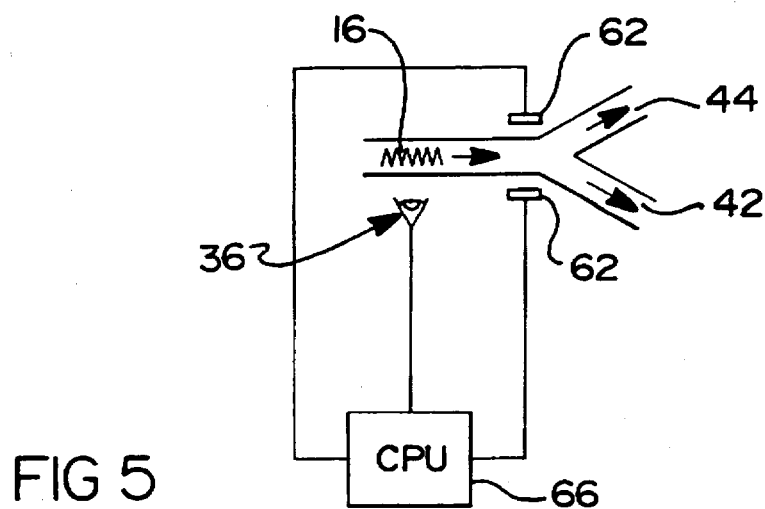
FIG. 5 is a schematic of the control for the automatic fin rotation apparatus of FIG. 2.
Figure 3:
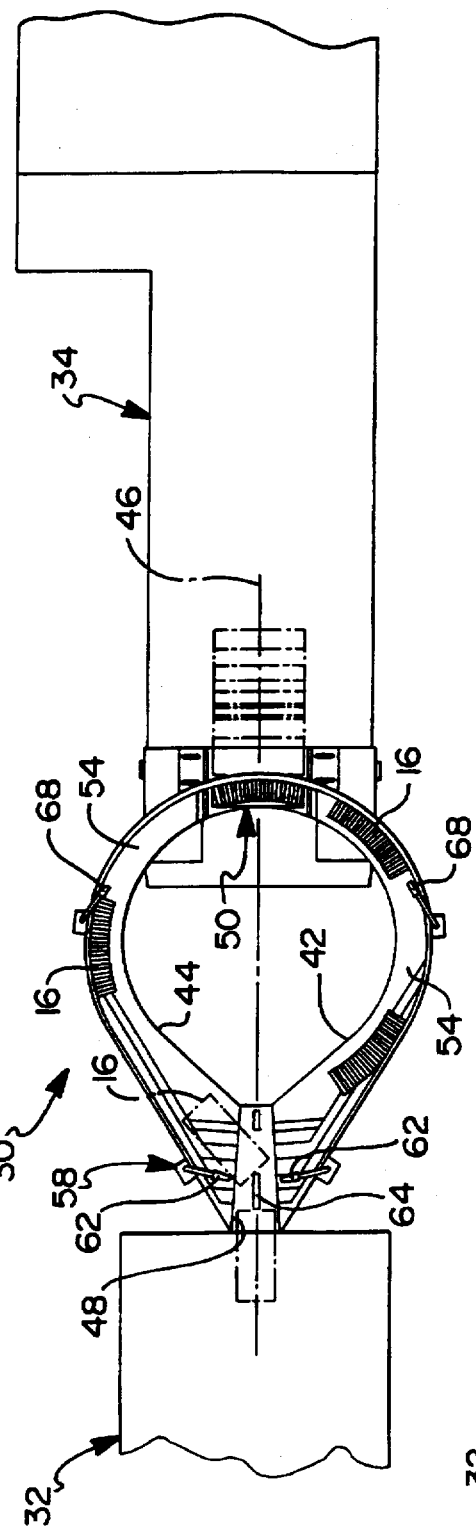
FIG. 3 is a top view of the automatic fin rotation apparatus of FIG. 2.
Figure 4:
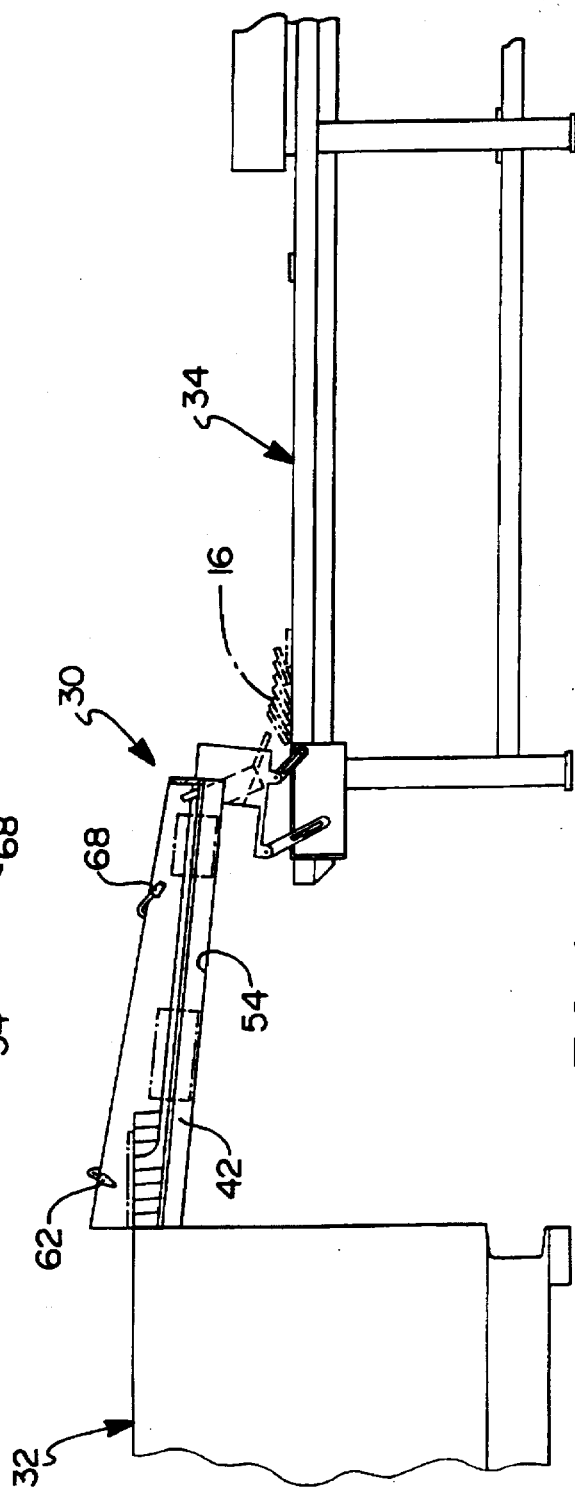
FIG. 4 is a side view of the automatic fin rotation apparatus of FIG. 2.

The apparatus 30 includes a sensor, generally indicated at 36 in FIG. 5, for sensing the presence of a series of fin strips 16 supplied to the apparatus 30 from an upstream manufacturing process represented by the fin mill machine 32 in FIGS. 2 through 4. When sensed by the sensor 36, each of the fin strips 16 in the series has a common orientation relative to the others. The sensor 36 will be discussed in greater detail below.

The apparatus 30 also includes an orienting member, generally indicated at 38, which receives signals from the sensor 36 as to the presence of each fin strip 16 and rotates each consecutive fin strip 16 in alternating clockwise and counter-clockwise directions to orientate consecutive fin strips 180° relative to each adjacent fin strip. The orienting member 38 has a chute 40 including a pair of opposed arcuate guide members 42, 44 which are disposed about the centerline 46 of the apparatus 30. The opposed arcuate guide members 42, 44 meet at both ends thereof to define an inlet 48 adapted to receive the series of fin strips 16 and a discharge portion 50 located opposite the inlet 48 on the orienting member 38. The opposed arcuate guide members 42, 44 are made of stainless steel and have an arcuate outer rail 52. The guide members 42, 44 each have a slide surface 54 over which the fins 16 move from the inlet 48 to the discharge portion 50. As shown in FIGS. 2 and 4, the slide surfaces 54 are inclined at an angle relative to the horizontal such that the fin strips 16 move over the slide surfaces 54 downwardly from the inlet 48 to the discharge portion 50 and against the outer arcuate rail 52. An opening 56 is located at the discharge portion 50 through which consecutive fin strips 16 oriented 180° relative to each other move and are then stacked at the preassembly staging area 34.

The orienting member 38 also includes an actuator, generally indicated at 58, located adjacent the inlet 48 which rotates consecutive fin strips 16 in alternating clockwise and counter-clockwise directions about a common vertical axis into alternating ones of the opposed arcuate guide members 42, 44. More specifically, the actuator 58 includes a pair of opposed, pneumatically actuated nozzles 62 disposed adjacent the inlet 48 and on either side thereof. The pneumatically actuated nozzles 62 are responsive to signals received from the sensor 36 to direct alternating blasts of air at each consecutive fin strip 16. These blasts of air rotate the fin strips 16 in an alternating clockwise and counter-clockwise direction about a common vertical axis and also move the consecutive fin strips 16 into alternating ones of the opposed arcuate guide members 42, 44. In this way, each consecutive fin strip 16 is rotated 90° in opposite directions relative to each other such that each adjacent fin strip 16 is orientated 180° relative to any adjacent fin strip at the discharge portion 50 of the opposed arcuate guide members 42, 44.

The orienting member 38 has an aperture 64 located at the inlet 48. The sensor 36 includes a photoelectric cell mounted beneath the inlet 48 and directed through the aperture 64 so as to sense the presence of each fin strip 16 passing through the inlet. The sensor 36 is electrically connected to a controller or central processing unit 66 which receives the signals from the sensor 36 and controls the operation of the actuator 58.

In addition, a pair of pneumatically actuated air nozzles 68 are disposed near the discharge portion 50 on the opposed arcuate guide members 42, 44 to help guide consecutive fin strips 16 toward the opening 56 at the discharge portion 50.

The present invention also involves a method of selectively and automatically orienting consecutive fin strips 16 having a common orientation relative to one another in preparation for manufacturing a heat exchanger. The method includes the steps of sensing the presence of each fin strip 16 in a series of fin strips supplied from an upstream manufacturing process wherein each fin strip 16 in the series has a common orientation relative to one another. In addition, the method includes the steps of rotating each consecutive fin strip in alternating clockwise and counter-clockwise directions about a common vertical axis to orientate the consecutive fin strips 180° relative to each adjacent fin strip. Furthermore, the step of orienting consecutive fin strips 180° relative to each adjacent fin strip 16 includes the step of moving consecutive fin strips 16 into alternating ones of a pair of opposed arcuate guide members 42, 44 disposed about the centerline 46 of the automatic fin rotation apparatus 30 which automatically orientates consecutive fin strips 180° relative to each adjacent fin strip at the discharge portion 50 of the opposed arcuate guide members 42, 44.

More specifically, the step of orienting consecutive fin strips 16 further includes directing alternating blasts of air at each consecutive fin strip 16 to rotate the fin strip 16 in alternating clockwise and counter-clockwise directions about a common vertical axis and to move the consecutive fin strips 16 into alternating ones of the opposed arcuate guide members 42, 44. In addition, the step of sensing the presence of each fin strip 16 in the series of fin strips 16 includes directing a photoelectric cell 36 through an aperture 64 at the inlet 48 of the opposed arcuate guide members 42, 44 and generating a signal responsive to the presence of each consecutive fin strip 16 and sending this signal to a controller 66 which controls the operation of the pneumatic actuator 58 located at the inlet 48 to move the fin strips 16 into alternating ones of the opposed arcuate guide members 42, 44.

In this way, each fin strip 16 is automatically rotated 90° in a direction opposite the direction of rotation of the adjacent fin strip 16 such that consecutive fin strips 16 are disposed 180° relative to one another at the preassembly staging area without the need for additional labor or expensive steps in the manufacturing process.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An apparatus for selectively orienting consecutive fin strips relative to one another as a preliminary step in the manufacture of heat exchangers, said apparatus comprising:

a sensor for sensing a presence of a series of fin strips supplied to said apparatus from an up-stream manufacturing process wherein each fin strip in the series has a common orientation relative to the others; and an orienting member which receives signals from said sensor as to the presence of each fin strip and rotates each consecutive fin strip in alternating clockwise and counter-clockwise direction to orient consecutive fin strips 180° relative to each adjacent fin strip.

2. An apparatus as set forth in claim 1 wherein said orienting member has a chute including a pair of opposed arcuate guide members disposed about a centerline of said apparatus with said opposed arcuate guide members defining an inlet adapted to receive a series of fin strips and a discharge portion located opposite said inlet on said orienting member wherein said consecutive fin strips are disposed 180° relative to any adjacent fin strip in the series.

3. An apparatus as set forth in claim 2 wherein each of said opposed arcuate guide members have an arcuate outer rail, said guide members having a slide surface over which the fins move from said inlet to said discharge portion, said slide surface being inclined at an angle relative to horizontal such that the fin strips move over said slide surface downwardly from said inlet to said discharge portion and against said outer arcuate rail.

4. An apparatus as set forth in claim 2 wherein said orienting member has an aperture disposed at said inlet, said sensor including a photoelectric cell mounted beneath said inlet and directed through said aperture so as to sense the presence of each fin strip passing through said inlet.

5. An apparatus as set forth in claim 2 wherein said guide members are made of stainless steel.

6. An apparatus as set forth in claim 2 wherein said orienting member includes an actuator located adjacent said inlet which rotates consecutive fin strips in alternating clockwise and counter-clockwise directions and into alternating ones of the opposed arcuate guide members to orient the fin strips 180° relative to each adjacent fin strip.

7. An apparatus as set forth in claim 6 wherein said actuator includes a pair of opposed pneumatically actuated nozzles disposed adjacent said inlet and on either side thereof, said pneumatically actuated nozzles responsive to said signals received from said sensor to direct alternating blasts of air at each consecutive fin strip to rotate the fin strip in an alternating clockwise and counter-clockwise direction and to move the consecutive fin strips into alternating ones of said opposed arcuate guide members.

8. An apparatus as set forth in claim 6 wherein said sensor is electrically connected to a controller which receives said signals and controls the operation of said actuator.

9. An automatic fin rotation apparatus disposed between a fin mill machine employed for making a series of fin strips for use in heat exchangers and a preassembly staging area, said apparatus employed for selectively orienting consecutive fin strips relative to one another as a preliminary step in the manufacturing of such heat exchangers, said apparatus comprising:

a sensor for sensing the presence of a series of fin strips supplied to said apparatus wherein each fin strip in the series has a common orientation relative to one another; and an orienting member having a chute including a pair of opposed arcuate guide members disposed about a centerline of said apparatus with said opposed arcuate guide members defining an inlet adapted to receive a series of fin strips and a discharge portion located opposite said inlet on said orienting member wherein said orienting member rotates each consecutive fin strip from its common orientation at said inlet in alternative clockwise and counter-clockwise directions such that consecutive fin strips are disposed 180° relative to each adjacent fin strip at said discharge portion.

10. An apparatus as set forth in claim 9 wherein each of said opposed arcuate guide members have an arcuate outer rail, said guide members having a slide surface over which the fins move from said inlet to said discharge portion, said slide surface being inclined at an angle relative to horizontal such that the fin strips move over said slide surface downwardly from said inlet to said discharge portion and against said outer arcuate rail.

11. An apparatus as set forth in claim 9 wherein said orienting member has an aperture disposed at said inlet, said sensor including a photoelectric cell mounted beneath said inlet and directed through said aperture so as to sense the presence of each fin strip passing through said inlet.

12. An apparatus as set forth in claim 9 wherein said guide members are made of stainless steel.

13. An apparatus as set forth in claim 9 wherein said orienting member includes an actuator located adjacent said inlet which rotates consecutive fin strips in alternating clockwise and counter-clockwise directions and into alternating ones of the opposed arcuate guide members to orient the fin strips 180° relative to each adjacent fin strip.

14. An apparatus as set forth in claim 13 wherein said sensor is electrically connected to a controller which receives said signals and controls the operation of said actuator.

15. An apparatus as set forth in claim 13 wherein said actuator includes a pair of opposed pneumatically actuated nozzles disposed adjacent said inlet and on either side thereof, said pneumatically actuated nozzles responsive to said signals received from said sensor to direct alternating blasts of air at each consecutive fin strip to rotate the fin strip in an alternating clockwise and counter-clockwise direction and to alternatingly move the consecutive fin strips into one of said opposed arcuate guide members.

16. A method of selectively orienting consecutive fin strips having a common orientation relative to one another in preparation for manufacturing a heat exchanger, said method including the steps of:

sensing a presence of each fin strip in a series of fin strips supplied from an upstream manufacturing process wherein each fin strip in the series has a common orientation relative to one another; and rotating each consecutive fin strip in alternating clockwise and counter-clockwise directions to orient the consecutive fin strips 180° relative to each adjacent fin strip in the series.

17. A method as set forth in claim 16 wherein said step of orienting consecutive fin strips 180° relative to each adjacent fin strip includes the step of alternatingly moving consecutive fin strips into one of a pair of opposed arcuate guide members disposed about a centerline of an automatic fin rotation apparatus which automatically orients consecutive fin strips 180° relative to each adjacent fin strip at a discharge portion of the opposed arcuate guide members.

18. A method as set forth in claim 17 wherein said step of orienting consecutive fin strips 180° relative to one another further includes directing alternating blasts of air at each consecutive fin strip to rotate the fin strip in alternating clockwise and counter-clockwise directions and to alternatingly move the consecutive fin strips into alternating ones of the pair of opposed arcuate guide members.

19. A method as set forth in claim 17 wherein said step of sensing the presence of each fin strip in a series of fin strips includes directing a beam from a photoelectric cell through an aperture at an inlet of the opposed arcuate guide members and generating a signal responsive to the presence of each consecutive fin strip and sending the signal to a controller which controls the operation of an actuator disposed at the inlet to alternatingly move consecutive fin strips into one of the opposed arcuate guide members.

* * * * *